Patented June 12, 1945

2,378,089

UNITED STATES PATENT OFFICE 2,378,089

PRODUCTION OF HIGH VISCOSITY POLYSTYRENE

Allen R. Krotzer, Philadelphia, Pa., Wilbert A. King, Memphis, Tenn., and Julius H. Kleiner, Atlantic City, N. J., assignors, by mesne assignments, to Allied Chemical & Dye Corporation, a corporation of New York No Drawing. Application December 12, 1940, Serial No. 369,742

12 Claims. (Cl. 260—91)

This invention relates to a new resin product obtained by polymerization of a styrene compound and characterized by the high strength and toughness of the solid and the high viscosity of the polymer in solution; the invention further relates to a new method for the production of polymerized styrene compound.

In the polymerization of styrene compounds it is considered desirable to produce resins which as solids are characterized by their high strength and toughness and in solution are characterized by their high viscosity. Such products are particularly valuable for the preparation of molded articles by such methods as extrusion, injection molding, etc. The viscosity of the polymer solution is at present one of the major commercial specifications of a polymerized styrene compound, since the viscosity of the solution is in general considered indicative of the relative toughness, strength and general value of the resin; these properties are all believed to reflect the molecular weight and molecular complexity of the polymer. Accordingly, various methods have heretofore been attempted to produce polystyrene characterized by high viscosity in solution. For example, styrene crudes have been subjected to elaborate pretreatments in an effort to remove completely inhibitors which tend to limit molecular size. It has also been recognized that polymerization at lower temperatures favors the formation of molecular structure of greater complexity. All methods heretofore proposed, however, for the production of polystyrene resins of higher viscosity in solution are costly and time consuming, and, moreover, have produced resin products showing only a small degree of improvement in viscosity and strength characteristics relative to the improvement obtainable by the process of this invention.

It is an object of this invention to provide an improved method for polymerization of a styrene compound, whereby a product of greatly improved strength and toughness as a solid and high viscosity in solution may be obtained as compared to the products heretofore obtained from the same crude at the same temperature of polymerization; it is a further object of this invention to provide a process for polystyrene-type resin production in which poorer crudes may be employed and more vigorous polymerization conditions imposed (i. e. higher temperatures employed) than in present polymerization processes without impairing the molecular complexity as reflected by high viscosity of the resulting resin in solution.

It is an additional object of this invention to produce a new polystyrene product of greater molecular complexity than polystyrene products heretofore produced as indicated by the greatly increased viscosity of solutions of the new product of this invention.

We have discovered that a polymerized styrene compound characterized by unusually high viscosity in solution may be prepared by carrying out polymerization of a styrene compound in the presence of a small amount of formaldehyde or formaldehyde polymer.

Further, in accordance with our invention, we have produced a new, tough polystyrene resin which is colorless, soluble in aromatic solvents, insoluble in alcohol and characterized by an absolute viscosity at 25° C. of at least 500 centipoises, and preferably at least 2,000 centipoises, for a 10% by weight solution of the polymer in toluene.

We have found this new polystyrene product may be obtained by heat-polymerization of a styrene solution, preferably a solution substantially free of inhibitors and other substances deleteriously affecting polymerization and free of stabilizer which is commonly added to styrene to inhibit polymerization. The new product may advantageously be prepared by carrying out the polymerization in the presence of .001% to 5%, preferably .1% to 1%, based on the weight of the solution, of formaldehyde or a formaldehyde polymer such as trioxymethylene or paraformaldehyde. To get a product of high quality it is particularly important that the formaldehyde compound be present from the beginning of polymerization. The polymerization temperature may be in the range of 75° to 200° C., preferably in the range of 80° to 100° C.; for optimum results and particularly if a colorless resin product is desired, the polymerization should be carried out in a closed vessel from which air has been excluded. The polystyrene product may be recovered by any one of several methods hereinafter described.

Application of the method of this invention results in the production of heat polymers from every grade of monomer crude of surprisingly greater viscosity when in solution than are obtainable from the same crudes under similar conditions of heat treatment in the absence of formaldehyde or its polymers. Accordingly, where various pretreatments of a crude have been necessary to remove constituents which deleteriously affect subsequent polymerization, or where styrene enrichment operations have heretofore been found necessary before carrying out polymerization, to produce a product of particular specification from a given source of styrene compound, the method of the present invention permits elimination of some or all of these preliminary operations. Moreover, the method of the present invention allows the use of more vigorous polymerization conditions, i. e. higher polymerization temperatures, than have heretofore been employed in the heat-polymerization of a given crude to produce a polymer of specified viscosity.

Under normal conditions of heat-polymerization not employing the process of the present invention, polystyrene may be prepared from substantially pure monomer, 10% solutions of which polystyrenes in toluene have viscosities in the range of 50 to 300 centipoises at 25° C. Polymerization in such cases is carried out over a range of 75° to 100° C., i. e. polymerization is started at 75° C and progressively increased during a three- to five-day period to 100° C. and held at the latter temperature for six to ten days or until polymerization is substantially complete. Polymerization at substantially lower temperatures than those would not be practicable since the time required to reach a substantial degree of conversion to polymer would amount to months or even years.

In contrast to this, polystyrene produced in accordance with the present invention may be obtained under commercially practicable conditions of polymerization, for example, at temperatures of 80° to 100° C. and in reasonable polymerization time, i. e. within a relatively few days, and the products thus produced we have found to have in solution viscosities much higher than the products obtained by the usual heat-polymerization methods not carried out in accordance with this invention. For example, we have obtained polystyrene products of such molecular complexity that a 10% by weight solution of the polymer in toluene would have at 25° C. an absolute viscosity above 7,000 centipoises.

The method of our invention is applicable to the polymerization of a styrene compound, which term is used herein to include styrene and styrene homologs, whatever the source of the styrene compound. For example, the styrene or methyl styrene fractions of various natural or synthetic sources may be employed. Examples of these sources include drip oil (the oil which settles out of gas mains), distillates from coke-oven gas and oil condensates, distillates from light oil used in gas washing operations, cracked petroleum products, the products of styrene synthesis and the products of pyrolysis of crude resins made by polymerizing styrene or styrene homologs. The material subjected to polymerization in accordance with this invention may vary from substantially undiluted styrene compound to a dilute solution containing a lower concentration of styrene compound than has been considered commercially feasible for production of polymer by methods heretofore used. We have found it advantageous to employ solutions containing about 25% to 100% styrene compound and particularly a solution containing over about 60% styrene compound, the remainder of the solution generally consisting predominantly of xylenes or toluene.

The monomeric crude employed in the process of our invention is preferably treated to remove stabilizers, other inhibitor material, and other constituents which deleteriously affect heat-polymerization, if present. Such pretreatment, for example, may consist merely of redistillation, or may consist of sulphuric acid treatment carried out in accordance with co-pending application Serial No. 349,279, filed August 1, 1940, in the name of Wilbert A. King or combined sulfuric acid and mercuric compound treatment carried out in accordance with the process described in co-pending application Serial No. 372,360, filed December 30, 1940, in the names of Wilbert A. King, Julius H. Kleiner and Allen R. Krotzer.

To the monomer or monomer solution, which has preferably been freed from inhibitors and stabilizer as indicated above, is added formaldehyde or a formaldehyde polymer such as trioxymethylene or paraformaldehyde, the amount of added aldehyde being from about .001% to 5%, preferably from about .1% to 1% based on the weight of the monomer solution. Alternatively, the monomeric styrene compound may be subjected to mild oxidation, for example by means of air or oxygen at temperatures not higher than 40° C. to minimize concurrent polymerization, or other mild oxidizing means, to produce formaldehyde in situ.

The monomer or monomer solution containing the aldehyde is then polymerized. Polymerization is preferably accomplished merely by prolonged heating of the monomer, but may also be accomplished by other methods, such as by subjecting the monomer or monomer solution to the action of ultra-violet light. The temperature of heat-polymerization may vary within the range of 75° to 200° C., depending upon the molecular complexity of product and the rate of polymerization desired. The preferred polymerization temperature range, as above indicated, is about 80° to 100° C. When polymerization is substantially complete, or when the rate of conversion has become so slow that it is considered uneconomical to carry the reaction further, the polymer product may be separated from the reaction mixture by vacuum or steam distillation, or by precipitation through addition of a solvent, such as an aliphatic alcohol, for all components of the mixture except the polymer. In those cases involving the use of this invention in the production of polymer-monomer mixtures, the monomer may be removed by the method described in co-pending application Serial No. 372,008, filed December 27, 1940, in the name of Wilbert A. King, involving solution of the reaction mixture in an organic solvent higher boiling than the monomer, e. g. trimethyl benzenes, and distillation under reduced pressure to remove the remaining monomer, followed by further distillation to remove the added solvent.

As above indicated, we have found that a polystyrene product may be prepared in accordance with our invention which is a colorless resin of good toughness and strength characteristics, soluble in aromatic solvents, and insoluble in alcohol. As indicative of the quality of this new polystyrene product we have found that solutions of the resin show a remarkably high viscosity. Our new product may be characterized by the absolute viscosity at 25° C. of a 10% by weight solution of the polymer in toluene; the viscosity of such a solution is at least 500 centipoises, and for a preferred product the viscosity is at least 2,000 centipoises.

The following examples are illustrative of our invention:

*Example 1.*—A styrene fraction obtained from drip oil by fractional distillation was prepared for polymerization by pretreatment with 50° Bé. sulfuric acid, followed by mercuric sulfate treatment as disclosed in the above-mentioned copending application Serial No. 372,360, and then by redistillation at reduced pressure. The purified crude was adjusted to 60% (by weight) styrene concentration by addition of refined xylene. Three 135-gram portions of the resulting solution were polymerized as described below. To the first portion, no aldehyde was added; to the second portion .135 gram of paraformaldehyde was added; and to the third portion 1.35 grams were added. The first portion thus contained no added aldehyde, the second portion contained .1% by weight of paraformaldehyde, and the third portion contained 1% by weight.

Each of these portions was sealed in glass under $CO_2$ and heated in a boiling water bath for 48 hours. The resulting product in each case was subjected to steam distillation at 180° to 220° C. to recover polystyrene product. The yields of polystyrene in the three test portions were, respectively, 42.3%, 36.1% and 34.9% by weight of available styrene. The resulting products were dissolved in toluene to form 25% by weight solutions and their viscosities measured at 25° C.

The polystyrene from the first portion of crude, to which no paraformaldehyde had been added, gave a solution of viscosity 1,450 centipoises. The viscosity of the solutions prepared from the polystyrene produced from the second and third portions, to which paraformaldehyde had been added, was in each case 3,600 centipoises. Thus, even when polymerization was carried out in the presence of only .1% by weight of formaldehyde, the viscosity of the resulting polystyrene solution was more than double the viscosity of a solution of polystyrene prepared without the addition of aldehyde.

*Example 2.*—Synthetic nonomeric styrene was diluted to 70% concentration with xylene, solid caustic added, and the mixture distilled to obtain a styrene distillate free of stabilizer. This styrene was adjusted to 60% (by weight) styrene concentration by addition of refined xylene. Four 135-gram portions of the refined crude were taken. No aldehyde was added to the first portion; and to the other three portions were added, respectively, .014 gram, .066 gram and .133 gram of paraformaldehyde. The paraformaldehyde concentrations in the four portions were thus, respectively, 0%, .011%, .049% and .099%.

Each portion was sealed in glass under $CO_2$ and heated in a boiling water bath for 48 hours. The resulting reaction mixture was subjected to steam distillation at 180° to 220° C. to recover the polystyrene product. The yields of polystyrene from the four portions were, respectively, 52.5%, 46.1%, 36.6% and 30.9%.

Two solutions in toluene of each polystyrene product were prepared, a 10% solution and a 25% solution, and the viscosity of each solution was determined at 25° C. The viscosities of the 25% solutions were, respectively, 2,300, 5,500, 5,900 and greater than 14,800 centipoises; the viscosities of the 10% solutions were, respectively, 55, 100, 105 and 290 centipoises.

*Example 3.*—Another sample of synthetic styrene monomer was prepared for polymerization by the procedure of Example 2. Four 135-gram portions of the resulting refined crude were taken. No aldehyde was added to the first portion, and to the other three portions were added, respectively, .135 gram, .662 gram and 1.34 grams of paraformaldehyde. The four test portions thus had paraformaldehyde concentrations, respectively, of 0%, .1%, .49% and .99%.

Each of the styrene solutions was sealed in glass under $CO_2$ and heated in a boiling water bath for 48 hours. The resulting reaction mixture was subjected to steam distillation at 180° to 220° C. to recover the polystyrene product. The yields of polystyrene from the four portions were, respectively, 56.2%, 38%, 28.3% and 29.6%.

Two toluene solutions of each of the polystyrene products were prepared, a 10% solution and a 25% solution, and the viscosity of each solution was determined at 25° C. The viscosities of the 10% solutions were, respectively, 52, 240, 240 and 230 centipoises. The viscosities of the 25% solutions were, respectively, 2,000 centipoises for the first test portion containing no added paraformaldehyde, and greater than 14,800 centipoises for the polystyrene of each of the other test portions containing added paraformaldehyde.

*Example 4.*—A styrene fraction obtained from drip oil by fractional distillation was prepared for polymerization by the procedure of Example 1. Two test portions of the resulting refined crude were taken, the first, 134.5 grams, and the second, 103.2 grams. No aldehyde was added to the first portion. Approximately .1 gram of paraformaldehyde was added to the second portion, giving a solution containing about .1% by weight of paraformaldehyde.

The two test portions were sealed in glass under $CO_2$ and heated in a boiling water bath for 48 hours. The resulting reaction mixtures were subjected to steam distillation at 180° to 220° C. to recover the polystyrene products. The yields were, respectively, 42.6% and 31.7% based on the weight of the available styrene.

A 25% solution in toluene of each polystyrene product was prepared and the viscosity measured at 25° C. The viscosity of the polystyrene solution from the first test portion was found to be 1,700 centipoises, while the viscosity of the polystyrene solution from the second test portion to which paraformaldehyde had been added was 5,480 centipoises.

*Example 5.*—A styrene fraction obtained from drip oil by fractional distillation was prepared for polymerization by the procedure of Example 1. Two test portions of the resulting refined crude were taken. To the first no aldehyde was added, and to the second trioxymethylene was added to form a solution containing .25% by weight trioxymethylene.

Each portion was sealed in glass under $CO_2$ and heated in a boiling water bath for 48 hours. The resulting reaction mixture was subjected to steam distillation at 180° to 220° C. to recover the polystyrene product. The yield in each portion was, respectively, 39.6% and 35.2%.

A 25% solution in toluene was prepared from each product and the viscosity tested at 25° C. The viscosity of the polystyrene solution from the first test portion to which no aldehyde had been added was 800 centipoises, while the viscosity of the polystyrene solution from the second test portion to which trioxymethylene had been added was 1,700 centipoises.

*Example 6.*—A styrene fraction obtained from drip oil by fractional distillation was prepared for polymerization by the procedure of Example 1. Two test portions of the resulting refined crude were taken. No aldehyde was added to the first portion, and sufficient paraformaldehyde was added to the second portion to form a solution containing .1% by weight of paraformaldehyde.

Each test portion was sealed in glass under $CO_2$ and heated in a boiling water bath for 48 hours. The resulting reaction mixture was dissolved in a fraction of refined hydrocarbons consisting predominantly of trimethyl benzenes and distilled, first, under reduced pressure to remove monomeric styrene and some trimethyl benzenes, and then subjected to steam distillation at atmospheric pressure to remove the residual hydrocarbon solvent and recover the polystyrene product. The yield of polystyrene in each portion was, respectively, 41.1% and 25% based on available styrene.

A 25% solution in toluene of each polystyrene product was prepared and the viscosity tested at 25° C. The solution of polystyrene from the test portion to which no aldehyde had been added had a viscosity of 680 centipoises and the solution of the polystyrene from the test portion to which paraformaldehyde had been added had a viscosity of 2,170 centipoises.

Example 7.—A styrene fraction obtained from drip oil by fractional distillation was prepared for polymerization by the procedure of Example 1. Two test portions of the resulting refined crude were taken. No aldehyde was added to the first portion, and sufficient paraformaldehyde was added to the second portion to form a solution containing .1% by weight of paraformaldehyde.

Each test portion was sealed in glass under $CO_2$ and heated in a boiling water bath for 48 hours. The resulting reaction mixture was dissolved in a fraction of refined hydrocarbons consisting predominantly of trimethyl benzenes and distilled, first, under reduced pressure to remove monomeric styrene and some trimethyl benzenes, and then subjected to steam distillation at atmospheric pressure to remove the residual hydrocarbon solvent and recover the polystyrene product. The yield from each test portion was, respectively, 35.7% and 25%, based on available styrene.

A 25% solution in toluene of each polystyrene product was prepared and its viscosity tested at 25° C. The solution of polystyrene from the test portion to which no paraformaldehyde had been added had a viscosity of 630 centipoises and the solution of polystyrene from the test portion to which paraformaldehyde had been added had a viscosity of 2,000 centipoises.

Example 8.—Substantially pure monomeric styrene was adjusted to 60% (by weight) styrene concentration by the addition of toluene. Four 150-ml. portions (132.4 grams) of this solution were taken. No aldehyde was added to the first portion. .8 gram of formaldehyde was added to the second portion, .8 gram of trioxymethylene was added to the third portion, and .66 gram of paraformaldehyde was added to the fourth portion. The four test portions thus contained, respectively, 0%, .6%, .6% and .5% aldehyde.

Each test portion was sealed in glass under $CO_2$ and heated in a boiling water bath for 48 hours. The resulting reaction mixture was dissolved is refined Hi-flash naphtha (largely trimethyl benzenes), distilled under reduced pressure to remove the toluene and residual monomeric styrene, and then steam-distilled at 220° C. under atmospheric pressure to remove the residual added naphtha and recover a polystyrene product. The yield of polystyrene in each case was, respectively, 56.5%, 30.5%, 29.8% and 29.7%, based on the weight of available styrene. All of these polymers were colorless, soluble in aromatic solvents, and insoluble in alcohol.

A 10% solution in toluene of each polymer was prepared and its viscosity determined at 25° C. The solution of polystyrene from the test portion to which no aldehyde had been added had a viscosity of 80 centipoises, the solution of polystyrene from the test portion to which formaldehyde had been added had a viscosity of 950 centipoises, the solution of polystyrene from the test portion to which trioxymethylene had been added had a viscosity of 1,250 centipoises, and the solution of polystyrene from the test portion to which paraformaldehyde had been added had a viscosity of 590 centipoises.

Example 9.—Another sample of substantially pure monomeric styrene was adjusted to 60% (by weight) styrene concentration by addition of toluene. Three portions of this solution, respectively, 121.9 grams, 131 grams, and 121 grams, were taken. To the first test portion no aldehyde was added; to the second test portion .5 gram trioxymethylene was added, and to the third test portion 1 gram of paraformaldehyde was added. The three test portions thus contained, respectively, 0% aldehyde, .38% aldehyde, and .83% aldehyde.

Each of these test portions was sealed in glass under $CO_2$ and heated for 13 days at 80° C. The polystyrene product was recovered as in Example 8 above. A 10% solution in toluene of each polystyrene was prepared and its viscosity tested at 25° C. The solution of polystyrene from the test portion to which no aldehyde had been added had a viscosity of 230 centipoises, the solution of polystyrene from the test portion to which trioxymethyylene had been added had a viscosity of 7,040 centipoises, and the solution of polystyrene from the test portion to which paraformaldehyde had been added had a viscosity of 6,000 centipoises.

Example 10.—Two portions were taken of a crude containing 99% styrene, and containing also as an impurity an inhibitor which limited the degree of molecular complexity upon polymerization of styrene. No aldehyde was added to the first portion and paraformaldehyde was added to the second portion to form a solution containing .1% by weight of paraformaldehyde.

Each test portion was sealed in glass under $CO_2$ and heated at 100° C. for six days. In each case the resulting polymer-monomer reaction mixture was dissolved in exactly nine times its weight of toluene. The absolute viscosity of the resulting 10% polymer-monomer solution in toluene was determined at 25° C. The solution from the test portion to which no aldehyde had been added had a viscosity of 100 centipoises and the solution from the test portion to which paraformaldehyde had been added had a viscosity of 1,760 centipoises.

Example 11.—A crude heat-polymerized resin from drip oil Hi-flash (boiling range about 150° to 205° C.) was pyrolyzed and a para-methyl styrene fraction distilling at about 173? C. was recovered from the pyrolysis product. This fraction contained about 95% by weight of the styrene homolog. Two portions of the crude were taken. The first was sealed in glass and held at 100° C. for 14 days. The other was similarly heated in the presence of 1% by weight of paraformaldehyde. The polymerized styrene compound was recovered in each case by dissolving the reaction mixture in high-boiling refined naphtha, and then subjecting to vacuum distillation, followed by steam distillation. The yields of polymerized styrene compound in the two test portions were, respectively, 95.5% and 80.3% based on available styrene homologs. A 25% solution of polymer in toluene was prepared from each of the two products and the viscosity tested at 25° C. The solution of polymer from the portion to which no aldehyde had been added had a viscosity of 175 centipoises, and the solution of polymer from the portion to which paraformaldehyde had been added had a viscosity of 660 centipoises.

It is noted that in each case the addition of a very small quantity of formaldehyde or formaldehyde polymer results in the production of a polymerized product which in solution has remarkably higher viscosity characteristics than the polymers prepared without addition of the aldehyde. This increase in viscosity is of great commercial importance. In some cases it appears the addition of aldehyde may reduce the rate of reaction to some extent, i. e. a somewhat lower yield of polymerized product is obtained in a given reaction time or, conversely, for a given resin yield more reaction time is required. This effect, however, is not a substantial one and the importance of the unusually high viscosity product obtained makes the retardation of polymerization relatively unimportant.

The theory of the action of formaldehyde and its polymers or the aldehyde formed by oxidation of styrene compound in promoting the production of much more complex polymers than could be produced without the added aldehyde is not completely understood. The action of the aldehyde may be catalytic, as evidenced by the very small amount necessary to produce the desired product. In Example 1, for instance, it made little difference whether .1% paraformaldehyde was present in the solution or ten times this amount, i. e. 1% paraformaldehyde. In either case, the same remakable improvement in viscosity characteristics was obtained. In Example 2, it is further noted, the presence of one one-hundredth of one percent paraformaldehyde in the styrene crude was sufficient to produce a product having a viscosity more than double that of the product produced without the added aldehyde.

It may be, however, that the added aldehyde, at least in some instances, enters into the reaction and the polymerized product may contain in combination a very small aldehyde content. Accordingly, where the terms "polystyrene" or "polymerized styrene compound," or terms of similar import, have been used in the specification and claims, they are not intended to exclude products in which a small proportion of aldehyde is present in the polymer composition. It is believed the use of these terms is proper even if aldehyde is preent in the composition of the polymer, since in each case the amount of aldehyde present is so small that the styrene compound polymer is by far the predominant constituent of the product.

The terms "styrene solution," "styrene compound crude," or "monomeric crude" as used in the claims are intended to include sources of styrene compound varying from substantially undiluted styrene compound to dilute solutions containing as low a concentration of styrene compound as is practicable for resin production, and are intended to include materials containing substantially no deleterious impurities as well as materials which may contain inhibitors or other deleterious substances.

The term formaldehyde compound as used in the claims means monomeric formaldehyde or polymers of formaldehyde, such as paraformaldehyde and trioxymethylene, or mixtures of formaldehyde and its polymers.

Since certain changes in carrying out the above process and certain modifications in the composition which embody the invention may be made without departing from its scope, it is intended that all matter contained in the above description shall be interpreted as illustrative and not in a limiting sense.

We claim:

1. In the production of a polystyrene resin from a styrene solution, the improvement which comprises carrying out heat-polymerization of the styrene in the presence of a formaldehyde compound selected from the group consisting of formaldehyde, paraformaldehyde and trioxymethylene, employed in an amount within the range of about .001% to 5% formaldehyde compound, based on the weight of the styrene solution, to modify the course of polymerization so as to produce a polymer of high molecular complexity.

2. In the production of a polymerized styrene compound from a monomeric crude, the improvement which comprises carrying out polymerization of the styrene compound in the presence of a formaldehyde compound selected from the group consisting of formaldehyde, paraformaldehyde and trioxymethylene, employed in an amount within the range of about .001% to 5% formaldehyde compound based on the weight of the monomeric crude, to modify the course of polymerization so as to produce a polymer of high molecular complexity.

3. In the production of a tough resin consisting predominantly of a polymerized styrene compound and characterized by high viscosity in solution from a monomeric styrene compound crude, the improvement which comprises carrying out heat polymerization of the styrene compound in the presence of a formaldehyde compound selected from the group consisting of formaldehyde, paraformaldehyde and trioxymethylene employed in an amount within the range of about .1 to 5% formaldehyde compound based on the weight of the monomeric crude, to modify the course of polymerization so as to produce a polymer of high molecular complexity.

4. In the production of a polystyrene resin by heat polymerization of a monomeric styrene solution at about 80 to 100° C., the improvement which comprises carrying out the heat polymerization of the styrene in the presence of a formaldehyde compound selected from the group consisting of formaldehyde, paraformaldehyde and trioxymethylene employed in an amount within the range of about .1 to 1% formaldehyde compound based on the weight of the monomeric styrene solution, to modify the course of polymerization so as to produce a polymer of high molecular complexity.

5. In the production of a tough polystyrene resin characterized by high viscosity in solution by heat polymerization at 80 to 100° C. of a pure monomeric styrene solution containing about 60 to 100% styrene, the improvement which comprises carrying out the heat polymerization of the styrene in the presence of a formaldehyde compound selected from the group consisting of formaldehyde, paraformaldehyde and trioxymethylene employed in an amount within the range of about .1 to 1% formaldehyde compound based on the weight of the monomeric styrene solution, to modify the course of polymerization so as to produce a polymer of high molecular complexity.

6. In the production of a tough resin consisting predominantly of a polymerized styrene compound and characterized by high viscosity in solution by heat polymerization of a styrene compound crude, the improvement which comprises carrying out the heat polymerization in the presence of monomeric formaldehyde employed in an amount within the range of about .001 to 5% based on the weight of the monomeric crude, to modify the course of polymerization so as to produce a polymer of high molecular complexity.

7. In the production of a tough resin consisting predominantly of a polymerized styrene compound and characterized by high viscosity in solution by heat polymerization of a styrene compound crude, the improvement which comprises carrying out the heat polymerization in the presence of paraformaldehyde employed in an amount within the range of about .001 to 5% based on the weight of the monomeric crude, to modify the course of polymerization so as to produce a polymer of high molecular complexity.

8. In the production of a tough resin consisting predominantly of a polymerized styrene compound and characterized by high viscosity in solution by heat polymerization of a styrene compound crude, the improvement which comprises carrying out the heat polymerization in the presence of trioxymethylene employed in an amount within the range of about .001 to 5% based on the weight of the monomeric crude, to modify the course of polymerization so as to produce a polymer of high molecular complexity.

9. In the production of a polystyrene from a monomeric styrene crude, the improvement which comprises carrying out polymerization of the styrene in the presence of a formaldehyde compound selected from the group consisting of formaldehyde, paraformaldehyde and trioxymethylene employed in an amount within the range of about .001% to 5% formaldehyde compound, based on the weight of the crude, sufficient to modify the course of polymerization so as to produce a polymer characterized by an absolute viscosity at 25° C. of at least 500 centipoises for a 10% by weight solution of the polymer in toluene.

10. In the production of a polystyrene from a monomeric styrene crude, the improvement which comprises carrying out polymerization of the styrene in the presence of a formaldehyde compound selected from the group consisting of formaldehyde, paraformaldehyde and trioxymethylene, employed in a sufficient amount to modify the course of polymerization so as to produce a polymer characterized by an absolute viscosity at 25° C. of at least 500 centipoises for a 10% by weight solution of the polymer in toluene.

11. A polystyrene resin of high molecular complexity characterized by an absolute viscosity at 25° C. of at least 500 centipoises for a 10% by weight solution of the resin in toluene obtained by polymerization of monomeric styrene in the presence of about .001% to 5% formaldehyde compound selected from the group consisting of formaldehyde, paraformaldehyde and trioxymethylene, based on the weight of the monomeric styrene oil.

12. A polystyrene resin of high molecular complexity characterized by an absolute viscosity at 25° C. of at least 2000 centipoises for a 10% by weight solution of the resin in toluene obtained by polymerization of monomeric styrene in the presence of about .1% to 5% formaldehyde compound selected from the group consisting of formaldehyde, paraformaldehyde, and trioxymethylene, based on the weight of the monomeric styrene oil.

ALLEN R. KROTZER.
WILBERT A. KING.
JULIUS H. KLEINER.